United States Patent
Drouet

(10) Patent No.: US 7,000,728 B2
(45) Date of Patent: Feb. 21, 2006

(54) NOISE REDUCING FLUID TRANSFER HOSE, IN PARTICULAR FOR A MOTOR VEHICLE POWER STEERING CONTROLLED SYSTEM

(75) Inventor: Philippe Drouet, Amilly (FR)

(73) Assignee: Hutchinson, Paris (FR)

( * ) Notice: Subject to any disclaimer, the term of this patent is extended or adjusted under 35 U.S.C. 154(b) by 373 days.

(21) Appl. No.: 10/182,152

(22) PCT Filed: Jan. 16, 2001

(86) PCT No.: PCT/FR01/00126

§ 371 (c)(1), (2), (4) Date: Feb. 24, 2003

(87) PCT Pub. No.: WO01/54959

PCT Pub. Date:Aug. 2, 2001

(65) Prior Publication Data

US 2003/0159876 A1 Aug. 28, 2003

(30) Foreign Application Priority Data

Jan. 28, 2000 (FR) .................................. 00 01112

(51) Int. Cl.
*F16L 55/02* (2006.01)
*F16L 55/033* (2006.01)

(52) U.S. Cl. ........................... 181/233; 138/30; 138/37

(58) Field of Classification Search ................ 181/233, 181/207, 247, 248, 249; 180/417; 138/30, 138/26, 37; 417/312; 285/49
See application file for complete search history.

(56) References Cited

U.S. PATENT DOCUMENTS

| | | | | |
|---|---|---|---|---|
| 3,323,305 A | * | 6/1967 | Klees ......................... | 181/207 |
| 5,094,271 A | * | 3/1992 | Fritz et al. .................... | 138/30 |
| 5,495,711 A | | 3/1996 | Kalkman et al. | |
| 5,513,675 A | * | 5/1996 | Toyama et al. ............... | 138/26 |
| 5,539,164 A | | 7/1996 | van Ruiten | |
| 5,941,283 A | * | 8/1999 | Forte .......................... | 138/26 |
| 6,073,656 A | * | 6/2000 | Chen et al. ................... | 138/26 |
| 6,123,108 A | * | 9/2000 | Chen et al. ................... | 138/30 |
| 6,158,472 A | * | 12/2000 | Hilgert ........................ | 138/26 |
| 6,688,423 B1 | * | 2/2004 | Beatty et al. ............... | 181/207 |
| 6,848,476 B1 | * | 2/2005 | Davis ......................... | 138/26 |

FOREIGN PATENT DOCUMENTS

EP    751337 A1 *  1/1997

OTHER PUBLICATIONS

XP-000726591 Jul. 1997.
"A Power Steering Pressure Hose with Two Rubber Sections;" Anon.; *Research Disclosure*; Jul., 1997; p. 469.

* cited by examiner

*Primary Examiner*—Edgardo San Martin
(74) *Attorney, Agent, or Firm*—D. Peter Hochberg; Sean Mellino; Katherine R. Vieyra

(57) ABSTRACT

A noise-attenuating fluid transfer conduit, in particular for a pilot-controlled power steering system of a motor vehicle, the conduit being mounted in a high pressure circuit for connecting an electrically-driven pump to a controlled member which is fed with pressurized fluid from said pump, said conduit being made up of alternating segments of rigid tube and segments of flexible hose, and at least one noise attenuator housed inside the conduit, wherein the flexible hose segments of the conduit are of a length which is determined as a function of as short as possible a response time associated with their volume expanding when the electrically-driven pump is set into operation.

10 Claims, 1 Drawing Sheet

NOISE REDUCING FLUID TRANSFER HOSE, IN PARTICULAR FOR A MOTOR VEHICLE POWER STEERING CONTROLLED SYSTEM

The invention relates to a noise-attenuating fluid transfer conduit in particular for a pilot-controlled power steering system of a motor vehicle.

BACKGROUND OF THE INVENTION

It is known that certain hydraulic conduits used in the automobile industry, and in particular those forming part of power steering systems, are provided with noise attenuators, often referred to in the art as "tuners".

In general, a power steering system comprises in particular a high pressure circuit with a hydraulic pump that feeds fluid under pressure to a servo-valve which is connected to the rack device of the system for steering the steerable wheels of the vehicle. The hydraulic conduit which connects the pump to the servo-valve is made up of flexible segments constituted by pieces of hose and rigid segments constituted by tubes, and often at least one noise attenuator in the form of a flexible sheath of metal or plastics material which is mounted inside a flexible segment of the conduit in order specifically to attenuate the operating noise of the pump which tends to travel up the steering column into the vehicle cabin.

A first generation of power steering systems in which the hydraulic pump was driven by the engine shaft of the motor vehicle has now been replaced by a second generation in which the hydraulic pump is driven by an electric motor, with such power systems often being referred to in the art as being of the electrically-driven pump type.

With this second generation of power steering systems where the hydraulic pump is dissociated from the engine shaft of the vehicle, it is possible to locate the pump in any location, however the available space is usually close to the vehicle cabin, given the lack of space that remains available in the engine compartment which is already very full.

At present, there is a third generation of power steering systems which are of the electrically-powered pump type as mentioned above, but which are also pilot-controlled in the sense that the electric motor driving the hydraulic pump is put into operation only when the steering wheel is turned by the driver.

With this third generation of power steering systems of the pilot-controlled type, noise attenuators need to operate over a larger frequency range of about 150 Hz to 800 Hz.

OBJECTS AND SUMMARY OF THE INVENTION

An object of the invention is to design a noise-attenuating hydraulic conduit which is particularly well adapted to a pilot-controlled power steering system of the above-specified type, but the invention is not limited specifically thereto.

To this end, the invention provides a noise-attenuating fluid transfer conduit, in particular for a pilot-controlled power steering system of a motor vehicle, the conduit being mounted in a high pressure circuit for connecting an electrically-driven pump to a controlled member which is fed with pressurized fluid from said pump, said conduit being made up of alternating segments of rigid tube and segments of flexible hose, and at least one noise attenuator housed inside the conduit, wherein the flexible hose segments of the conduit are of a length which is determined as a function of as short as possible a response time associated with their volume expanding when the electrically-driven pump is set into operation.

In general, the response time is about 40 milliseconds (ms) to 60 ms, and in particular is about 50 ms.

With a pilot-controlled power steering system of the third generation as specified above, the response time of the power steering involves in particular the reaction time associated with the steering wheel being turned and which can vary from one manufacturer to another, and the reaction time associated with the expansion in volume of the hose segments in the high-pressure conduit connecting the pump to the servo-valve.

By way of example, on the basis of a maximum response time of about 120 ms with a reaction time associated with turning the steering wheel of about 70 ms, there remains only about 50 ms in the reaction time for the volume of the segments of hose in the conduit to expand.

As a result, the reaction time allowed for volume expansion of the hose segments of the conduit is relatively short, which puts a limit on the length of these segments.

In conventional manner, the conduit includes at least one noise attenuator, but unlike an assembly technique in widespread use, the attenuator is not necessarily received inside either a flexible or a rigid segment of the conduit, i.e. part of a single attenuator can extend in a flexible segment and another part can extend in a rigid segment of the conduit.

In an embodiment which accommodates a response time of about 50 ms for the expansion in volume of the hose segments of the conduit, said conduit comprises five segments, specifically, starting from the pump:

a first end segment of tube connected to the pump;
a first intermediate segment of hose;
a central segment of tube;
a second intermediate segment of hose; and
a second end segment of tube connected to the controlled member, with
a first noise attenuator housed in part in the central segment of tube and in part in the second intermediate segment of hose; and
a second noise actuator which is housed in the second end segment of tube.

In this embodiment:
the first and second end segments of tube extend respectively over lengths of about 200 millimeters (mm), of about 430 mm for a right-hand pipe, and about 533 mm for a left-hand pipe;
the central segment of tube extends over a length of about 300 mm; and
the first and second intermediate segments of hose extend respectively over lengths of about 175 mm and about 235 mm.

Still in this embodiment, the first noise attenuator occupies a length of about 514 mm, of which about 368 mm are inside the central segment of tube, and the second noise attenuator extends over a length of about 200 mm.

Still in this embodiment, the segments of tube have an inside diameter of about 8 mm, the segments of hose have an inside diameter of about 10 mm, and the noise attenuators have an outside diameter of about 6 mm.

In general, the noise attenuators can be constituted by a sheath of metal or of plastics material.

Thus, a conduit of the invention makes it possible to reach a compromise that satisfies simultaneously the conditions imposed by vehicle manufacturers both concerning the response time of power steering and concerning the attenuation of noise that results in particular from the pump operating intermittently.

The invention also provides a pilot-controlled power steering system for a motor vehicle, wherein the system comprises a high pressure circuit fitted with a conduit as defined above, said conduit being mounted between an electrically-driven pump and a servo-valve which is connected to the rack device of the steering system of the motor vehicle, and wherein said system is controlled by turning the steering wheel.

BRIEF DESCRIPTION OF THE DRAWINGS

Other advantages, characteristics, and details of the invention appear from the additional description below, made with reference to the accompanying drawing, given purely by way of example, and in which.

MORE DETAILED DESCRIPTION

Figure 1:
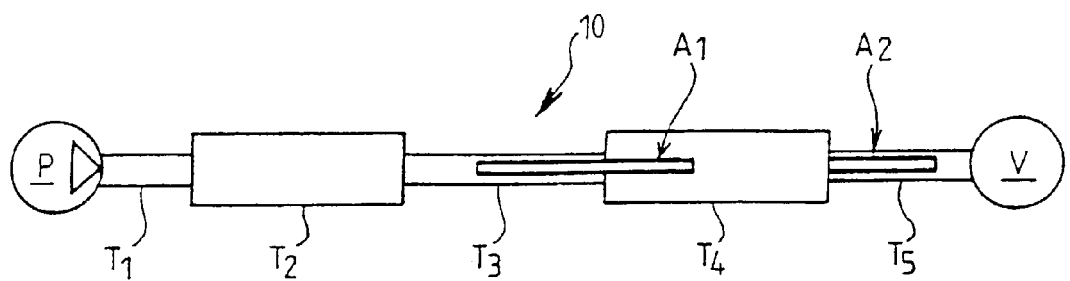
FIG. 1 is a diagrammatic view showing the various segments of a hydraulic conduit of the invention for a pilot-controlled power steering system.

Reference is made to FIG. 1 which shows an example of a hydraulic conduit 10 for a pilot-controlled power steering system of a motor vehicle;

The view of the system is deliberately restricted to the high pressure circuit between an electrically-driven pump which is connected to a fluid tank and which is driven by an electric motor, and a servo-valve V which is fed with fluid under pressure by the pump P and which is connected to the rack device of the system for steering the steerable wheels of the motor vehicle.

The hydraulic conduit 10 is mounted between the outlet of the pump P and an inlet of the servo-valve V, and it is constituted by alternating rigid segments made of tubes and flexible segments made of pieces of hose.

In the embodiment shown in FIG. 1, the hydraulic conduit 10 is constituted by the following, starting from the pump P:

a first end segment of tube T1 which is connected to the outlet of the pump P and which extends over a length of about 200 mm;

a first intermediate segment of hose T2 which extends over a length of about 175 mm;

a central segment of tube T3 which extends over a length of about 300 mm;

a second intermediate segment of hose T4 which extends over a length of about 235 mm; and a second end segment of tube T5 which is connected to an inlet of the servo-valve V and which extends over a length of about 430 mm for a right-hand pipe or about 533 mm for a left-hand pipe.

The segments of tube T1, T3, and T5 are made of metal with an inside diameter of abut 8 mm, whereas the segments of hose T2 and T4 have an inside diameter of about 10 mm, for example, and comprise at least one layer of material which is compatible with the fluid being transported and an outer coating providing protection against attack from the outside environment.

The conduit 10 is fitted with noise attenuators, there being two such attenuators in this embodiment, namely:

a first noise attenuator A1 mounted in part in the central segment of tube T3 and in part in the second intermediate segment of hose T4, said first attenuator having an outside diameter of about 6 mm and extending over a length of about 514 mm, of which about 368 mm are inside the tube T3 and 146 mm are inside the hose T4; and a second noise attenuator A2 which is mounted in the second end segment of tube T5 starting from the second intermediate segment of hose T4, having an outside diameter of about 6 mm and a length of about 200 mm.

In general, each noise attenuator A1 or A2 is constituted by a flexible sheath which can be made of metal and which can be helically wound, with single L-shaped seaming or double U-shaped seaming, for example, or it can be made of plastics material and pierced at predetermined locations by holes for passing the liquid flowing in the conduit 10.

Figure 2:
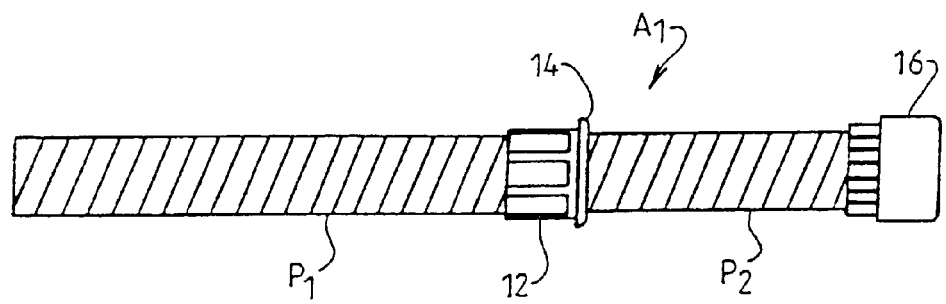
FIG. 2 shows a first noise attenuator which is housed in the conduit shown in FIG. 1.
Figure 3:
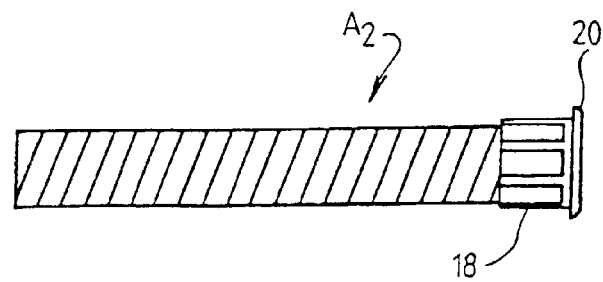
FIG. 3 shows a second noise attenuator which is likewise housed in the conduit shown in FIG. 1.

In the embodiments shown in FIGS. 2 and 3, each of the noise attenuators A1 and A2 is constituted by a flexible metal sheath with double seaming, for example.

The first noise attenuator A1 as shown in FIG. 2 is subdivided into two portions P1 and P2 extending respectively in the central segment of tube T3 and in the second intermediate segment of hose T4, these two portions being interconnected by means of a metal ring 12 that is fixed by crimping. The ring 12 also has a collar 14 which serves as an abutment for positioning the noise attenuator A1 in the central segment of tube T3 prior to connecting said segment of tube T3 with the segment of hose T4.

Advantageously, the free end of the portion P2 of the noise attenuator A1 which is received in the segment of hose T4 itself receives an elastomer ring 16, for example, so as to avoid subjecting the hose T4 to wear following vibration due to the pulsating type of pressurized fluid flow leading to the attenuator repeatedly striking against the inside wall of the hose T4.

The second noise attenuator A2 as shown in FIG. 3 has a metal ring 18 at one end which is fixed thereto by crimping and also has a positioning collar 20 for positioning it in a segment of tube T5 prior to connecting said segment of tube T5 to the segment of hose T4.

The coupling devices between the segments of tube and of hose are not shown. By way of example, the end of a segment of tube can form an endpiece onto which an end of a segment of hose is engaged as a force-fit, after which a metal ring is tightened about them so as to ensure they remain connected together.

The embodiment of the invention as described above satisfies the requirement for power steering to have a maximum response time of about 120 ms, of which about 50 ms corresponds to the flexible hose segments of the conduit expanding in volume.

It should be observed that the positions of the two noise attenuators A1 and A2 inside the conduit are novel per se, i.e. the two attenuators are not necessarily housed inside flexible hose segments of the conduit, without that detracting from the effectiveness of the system.

In general, the invention is not limited to the embodiments described above as applied to a pilot-controlled power steering system of a motor vehicle. In particular, the conduit of the invention can be applied to any pipe that transfers fluid under pulse conditions and that includes flexible segments of hose.

What is claimed is:

1. A noise-attenuating fluid transfer conduit for a pilot-controlled power steering system of a motor vehicle, the conduit being mountable in a high pressure circuit for connecting an electrically-driven pump (P) to a controlled member (V) which is fed with pressurized fluid from said pump, said conduit comprising five segments, namely, going from the pump:
- a first rigid end segment of tube (T1) connected to the pump;
- a first flexible intermediate segment of hose (T2) communicable with said first rigid end segment of tube (T1);
- a central rigid segment of tube (T3) communicable with said first flexible intermediate segment of hose (T2);
- a second flexible intermediate segment of hose (T4) communicable with said central rigid segment of tube (T3); and
- a second rigid end segment of tube (T5) communicable with said second flexible intermediate segment of hose (T4) and connected to the controlled member, the flexible hose segments (T2, T4) of the conduit being of a length which is determined as a function of a response time as short as possible associated with the volume of said flexible hose segments (T2, T4) expanding when the electrically-driven pump (P) is set into operation, and at least two noise attenuators (A1, A2) being housed inside the conduit, wherein the first noise attenuator (A1) is housed in part in the central rigid segment of tube (T3) and in part in the second flexible segment of tube (T4), and wherein the second noise attenuator (A2) is housed in the second rigid end segment of tube (T5).

2. The conduit according to claim 1, wherein the response time is about 40 ms to 60 ms.

3. The conduit according to claim 2, wherein the response time is about 50 ms.

4. The conduit according to claim 1, wherein:
- the first segment of tube (T1) extends over a length of about 200 mm and the second length of tube (T5) extends respectively over a length of about 430 mm for a right-hand pipe, and about 533 mm for a left-hand pipe;
- the central segment of tube (T3) extends over a length of about 300 mm; and
- the first and second intermediate segments of hose (T2, T4) extend respectively over lengths of about 175 mm and about 235 mm.

5. The conduit according to claim 4, wherein the first noise attenuator (A1) extends over a length of about 514 mm.

6. The conduit according to claim 4, wherein the first noise attenuator (A1) extends over a length of about 368 mm in the central segment of tube (T3) of the conduit.

7. The conduit according to claim 5, wherein the second noise attenuator (A2) extends over a length of about 200 mm.

8. The conduit according to claim 1, wherein the segments of tube (T1, T3, T5) have an inside diameter of about 8 mm, the segments of hose (T2, T4) have an inside diameter of about 10 mm, and the noise attenuators (A1, A2) have an outside diameter of about 6 mm.

9. The conduit according to claim 1, wherein the noise attenuators (A1, A2) are a sheath made of a material selected from the group consisting of metal and plastic.

10. A pilot-controlled power steering system for a motor vehicle, wherein said system comprises a high pressure circuit fitted with a conduit according to claim 1, an electrically-driven pump, a servo-valve (V) and a steering wheel, said conduit being mounted between said electrically-driven pump (P) and said servo-valve (V) which is connected to the rack device of the steering system of the motor vehicle, and wherein said system is controlled by turning the steering wheel.

* * * * *